(12) United States Patent  
Tseng

(10) Patent No.: US 8,136,638 B2  
(45) Date of Patent: Mar. 20, 2012

(54) SAFETY BRAKING SYSTEM

(76) Inventor: Ton-Rong Tseng, Banciao (TW)

( * ) Notice: Subject to any disclaimer, the term of this patent is extended or adjusted under 35 U.S.C. 154(b) by 1253 days.

(21) Appl. No.: 11/775,291

(22) Filed: Jul. 10, 2007

(65) Prior Publication Data

US 2009/0014258 A1 Jan. 15, 2009

(51) Int. Cl.  
*B62L 3/00* (2006.01)
(52) U.S. Cl. .................................................. 188/24.22
(58) Field of Classification Search ............... 188/24.15, 188/24.16, 24.21, 24.22, 72.9; 74/519, 520, 74/521, 502.2

See application file for complete search history.

(56) References Cited

U.S. PATENT DOCUMENTS 7,104,155 B2 * 9/2006 Nilsson .................. 74/502.2  
2004/0079186 A1 * 4/2004 Nilsson .................. 74/502.6

* cited by examiner

*Primary Examiner* — Robert Siconolfi  
*Assistant Examiner* — Vu Q Nguyen  
(74) *Attorney, Agent, or Firm* — C. G. Mersereau; Nikolai & Mersereau, P.A.

(57) ABSTRACT

A safety braking system mounted to a bike, motorcycle or any other two-wheel linear type of vehicle adapted with a right and a left brake lever to respectively control applying a brake to a front wheel and a rear wheel of the vehicle to control a rear wheel brake to brake a rear wheel first before applying a brake to a front wheel when either brake lever is pulled on any side or simultaneously on both sides of the vehicle to prevent it from easily turning over.

1 Claim, 17 Drawing Sheets

SAFETY BRAKING SYSTEM

BACKGROUND OF THE INVENTION (a) Field of the Invention

The present invention is related to a safety braking system, and more particularly to one that effectively improve braking mechanism of a mini type or linear 2-wheel vehicle, e.g., a bike or motorcycle, upgrade safety, and minimize injuries due to improper control, application, or operation of a brake.

(b) Description of the Prior Art

A brake is a safety device, also an extremely important component for vehicles; improper application or poor design of the brake frequently results in traffic accident even causes the driver and/or a third party to sustain major hazard or loss.

Essentially the brake operates by having linings to tightly pull or clip a brake disc or drum. In a light-duty vehicle, e.g., a bike, it is usually designed with linings to directly pull or clip tight a rim of a wheel of the bike. A hand brake is usually adapted to a bike, motorcycle or other light-duty vehicle while larger vehicles usually operate mechanical brake or power aided brake. However, all these types of brakes are found with many drawbacks, and the most serious and thus most important drawback is insufficient braking force or difficulty in managing the braking force, contributing to or aggravate major traffic accident or injuries.

For being light, convenient, easy manipulation, sold at affordable price, a linear two-wheel bike is most popular among light-duty vehicles. A bike not only relied upon as a short-range transportation means, but also used as for traveling, sporting, or racing purpose provides diversified applications. A light-duty motorcycle is another familiar type of linear two-wheel vehicle.

Upon riding on a bike or a motorcycle, weight of the vehicle is supported only on a straight line. A bike or motorcycle is unstable because it has a high center of gravity, and is thus vulnerable to deflect or slant, or even slip and fall when subject to external force or voluntarily swing to left or right by its rider. If brake is applied only to the front wheel and not to the rear wheel of the bike or the motorcycle, the center of gravity would lean forward to significantly reduce stability of the frame and the rider, thereby frequently resulting in accident. Therefore, while applying a brake on a bike or a motorcycle of linear two-wheel construction, the braking must be first applied on its rear wheel before applying a brake to the front wheel for safety reason. This is particularly important for a vehicle adapted with a front shock absorber. Braking the front wheel first on riding the vehicle adapted with the front shock absorber will cause the shock absorber to sink to bring further the center of gravity of the rider who is already in a position of comparatively higher center of gravity. Leaning forward plus the acceleration force would cause the vehicle to toss around and seriously threaten the life of the rider.

In a linear two-wheel bike or motorcycle, it is usually disposed with a hand brake and provided each to both of a right and a left handles. The left hand brake controls application of a brake for the front wheel; and the right one, the rear wheel. However, it may be the opposite case to some frames of the vehicles. That is, there is the absence of mandatory principle or standard on whether which hand brake should control which wheel, and that is totally left for the frame manufacturer, a bodywork shop or a rider to determine on discretion. This makes the vehicle particularly danger to one who is not a frequent rider or is using a brake stranger to him/her.

Furthermore, a rider when encountered by an emergency tends to naturally apply the hand brake mounted on the side where the imminent threaten is approaching instead of braking the rear wheel first before breaking the front wheel. That makes even dangerous to the rider has to do the right action in a quick response in facing an emergency situation.

SUMMARY OF THE INVENTION

The primary purpose of the present invention is to provide safe brake, which is mounted to a bike, motorcycle or any other vehicle provided with two independent hand brakes for both wheels, that makes sure of always braking the rear wheel before braking the front wheel disregarding the left or the right hand brake is applied first for achieving safe effects by helping stabilize the frame and prevent from turning over.

To achieve the purpose, a safe brake of the present invention is designed with two stages of braking mechanism, the primary mechanism and the secondary power transmission mechanism. Both hand brakes are linked to the primary mechanism where the braking force is transferred to the secondary power transmission mechanism for the secondary power transmission mechanism to transfer braking force to both brakes on a front wheel and a rear wheels to realize the control of having applied brake to the rear wheel first before the rear wheel.

The secondary power transmission mechanism in the safe brake of the present invention is related to a sheave comprised of two rollers. Two rollers move relatively to each other when the primary mechanism is subject to a braking force applied by a brake lever thus to cause a front wheel brake and a rear wheel brake to apply braking the front and the rear wheels in sequence.

Each roller further includes a larger wheel and a smaller wheel with each wheel provided with a groove along its edge. A cable winding up the larger wheel is then connected to a lead cable engaging the rear wheel brake; and a cable winding up the smaller wheel is then connected to a lead cable engaging the front wheel brake. Accordingly, upon applying a brake, all motive forces will pull the brake roller whether the right or the left hand brake lever is exercised to cause both rollers to have relative displacement for the brake rollers to operate the brake cable to realize consistent brake control mode. Whereas both brake rollers are not in the same diameter, a pull force exercised by the lead cable of the rear wheel brake placed on the larger roller is faster and greater than that by the lead cable of the front wheel brake placed on the smaller roller since the perimeter of the larger roller is longer than that of the smaller roller to ensure that the rear wheel is braked before the front wheel.

Design and construction of two relative rollers in a safety braking system of the present invention provide a type and functions of a pulley in physics to feature effort-saving; and the ratio between both rollers may vary depending on the model of the vehicle while allowing design or adjust braking force and the ratio of braking forces respectively applied on the front wheel and the rear wheel depending on the model of the vehicle.

The roller may be directly pulled closer or farther by a brake cable of the brake lever, or the brake cable is pulled by revolution using a pinion.

Furthermore, many improved design for the construction of a safety braking system may be realized according to the present invention. For example, two arc levers of the safety braking system pivoted to each other at the center of each arc lever; one side of the arc lever is connected to the brake cable of the brake lever while the other side in relation to the pivoting point is disposed with two wheels each with groove along its edge for each arc lever. The cable surrounding those two wheels each with groove along its edge at the distal end of the pivoting point is connected to the lead cable of the front wheel brake. By changing a distance between the wheel with groove along its edge and the pivoting point, an amount of change in the lead cable connected to where between two wheels with groove along its edge disposed to the outer side of the arc lever is greater than that of the lead cable disposed on an inner side of the arc lever to permit the rear wheel to be braked first before the front wheel. Alternatively, a brake lever brake cable is connected to one side of the arc lever; two wheels each with a groove along its edge are disposed on each arc lever on the opposite side to the pivoting point; two wheels on one arc lever are fixed to a same point on the arc lever and hold a lead cable jointly with another two wheels with a groove along its edge to cause the lead cable to create different amount of change. Furthermore, a brake lever brake cable is connected to one side of the arc lever; two wheels each with a groove along its edge are disposed to an arc lever on the opposite side to the pivoting point; and the lead cable held by another two wheels each with a groove along its edge is fixed to another arc lever to achieve the purpose of having a time delay in applying brake respectively for the front and the rear wheel of the vehicle.

By providing those three types of installations, multiple wheels each with a groove along its edge that connect the front and the rear brakes to be individually mounted to such that the position of those wheels each with a groove along its edge controlling the front wheel is closer to the pivoting point than those controlling the rear wheel is thus to produce different braking force and time delay; and a locating mechanism is provided for the rider to readjust the position of each wheel with a groove along its edge according to his/her riding behavior for improved safety.

DETAILED DESCRIPTION OF THE PREFERRED EMBODIMENTS

Figure 1:
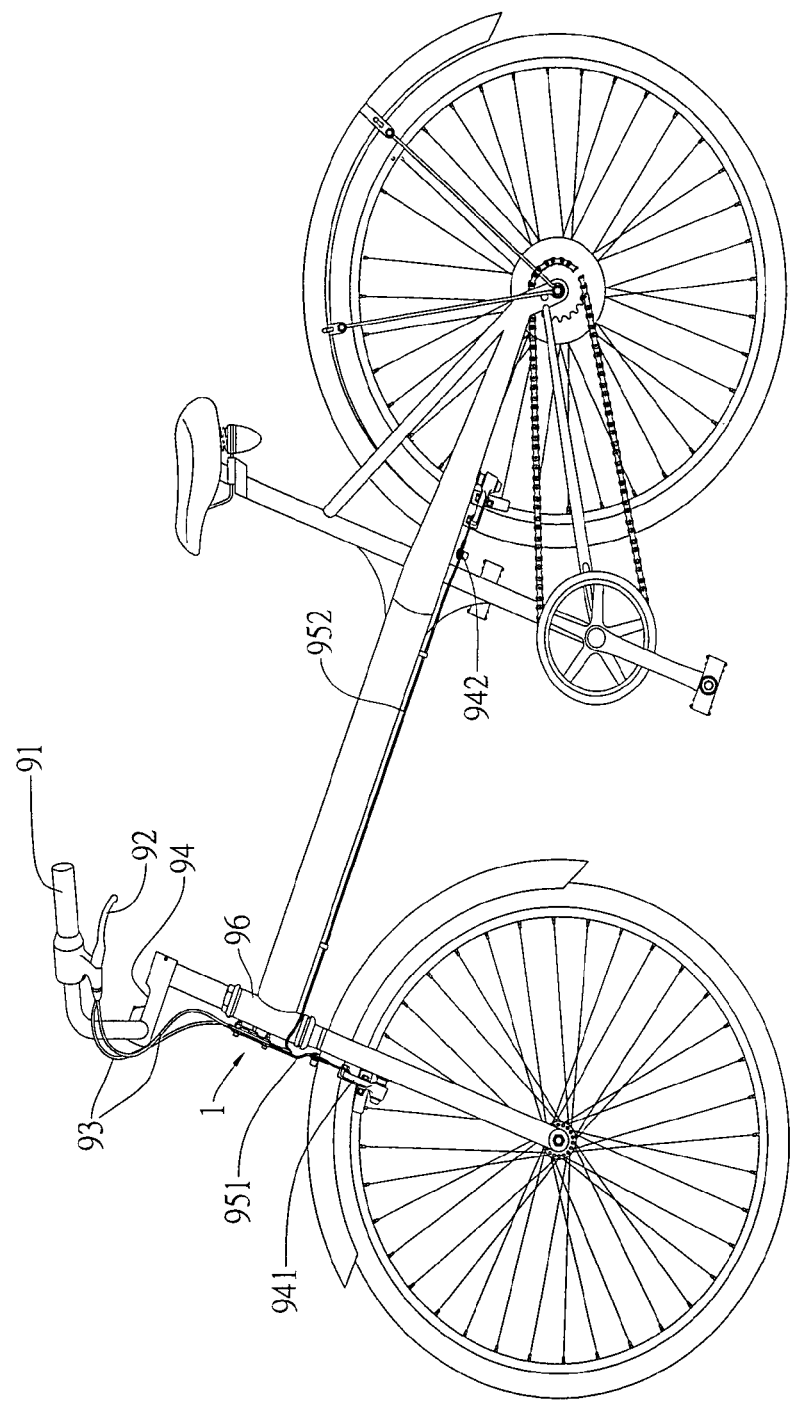
FIG. 1 is a schematic view showing a bike mounted with a safety braking system of the present invention.

Referring to FIG. 1, the present invention is adapted to a bike, a light-duty motorcycle or any other light-duty vehicle provided with both left and right brake levers to respectively control braking a front wheel and a rear wheel, and the bike is taken as an example for the purpose hereunder. As illustrated, the bike is provided with a right handlebar and a left handlebar 91 respectively mounted with a manual brake lever 92; and a brake cable 93 connects both brake levers 92 to a safety braking system 1 of the present invention. The safety braking system 1 is mounted to a head tube 96 or where between both handlebars 91, or coupled to a stem 94 and connected to a lead cable 951 and a lead cable 952 respectively of a front wheel brake 941 and a rear wheel brake 942. Accordingly, when either of both brake levers 92 is pulled, the rear wheel brake 942 applies first a brake on the rear wheel and then the front wheel brake 941 applies a brake on the front wheel.

Figure 2:
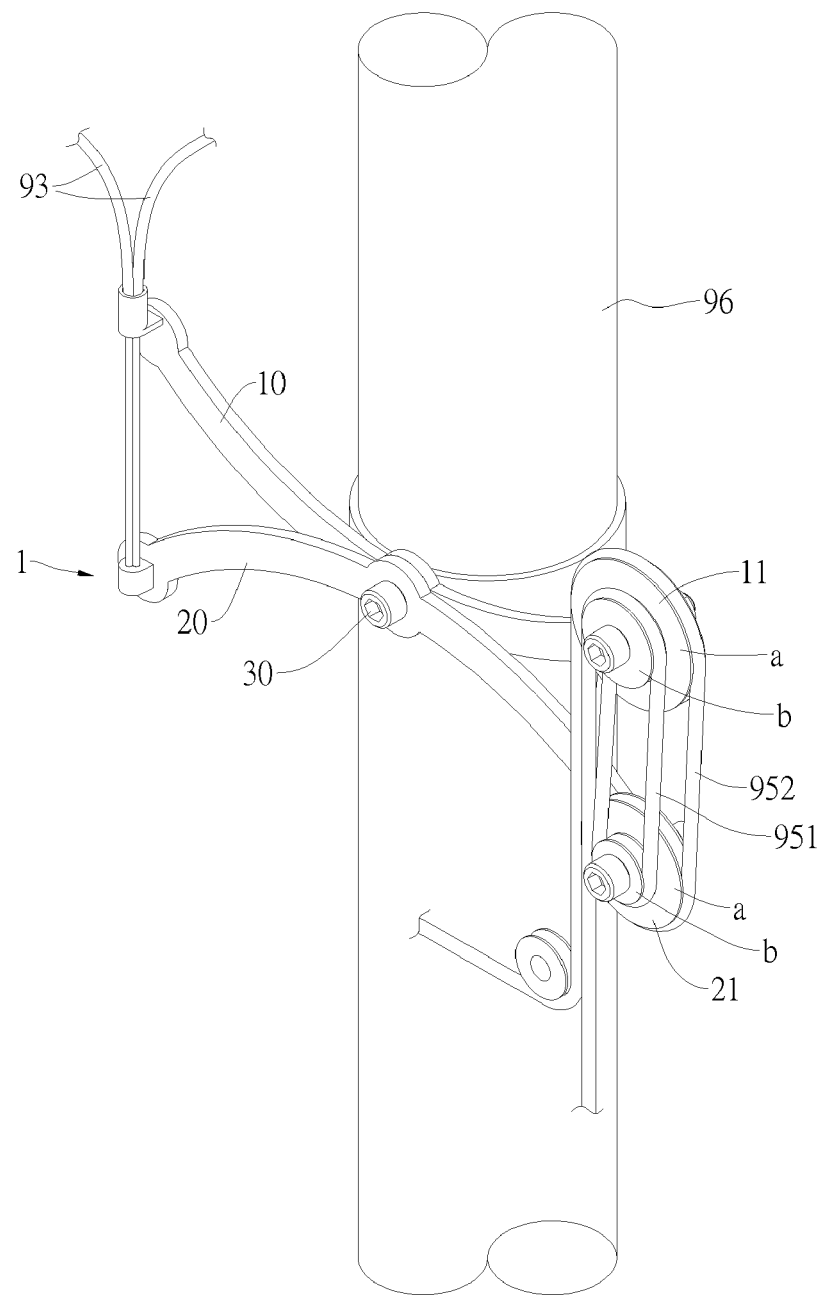
FIG. 2 is a perspective view of a first preferred embodiment of the present invention.

In a first preferred embodiment of the safety braking system 1 of the present invention as illustrated in FIG. 2, the safety braking system 1 mounted to the head tube 96 is comprised of two arc levers 10, 20 pivoted to each other at a pivoting point 30; two brake cables 93 are connected to one side of both arc levers 10, 20 to form a primary mechanism. On the opposite side of the pivoting point 30 are respectively provided with two rollers 11, 21 to form a secondary power transmission mechanism.

Figure 3:
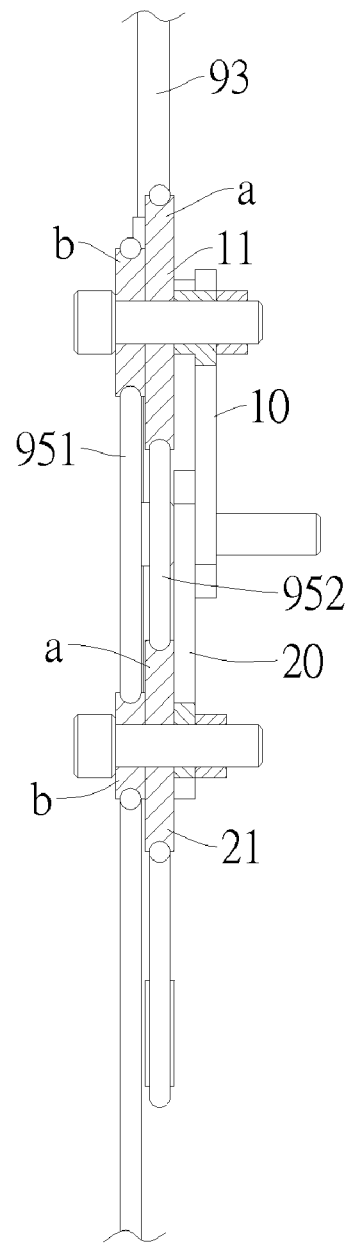
FIG. 3 is a sectional view of the first preferred embodiment of the present invention.

Now referring to FIG. 3, each roller 11, 21 includes a larger wheel a and smaller wheel b with each provided with a groove on its edge; both larger wheels a hold the lead cable 952 of the rear wheel brake; and both smaller wheels b hold the lead cable 951 of the front wheel brake.

Figure 4:
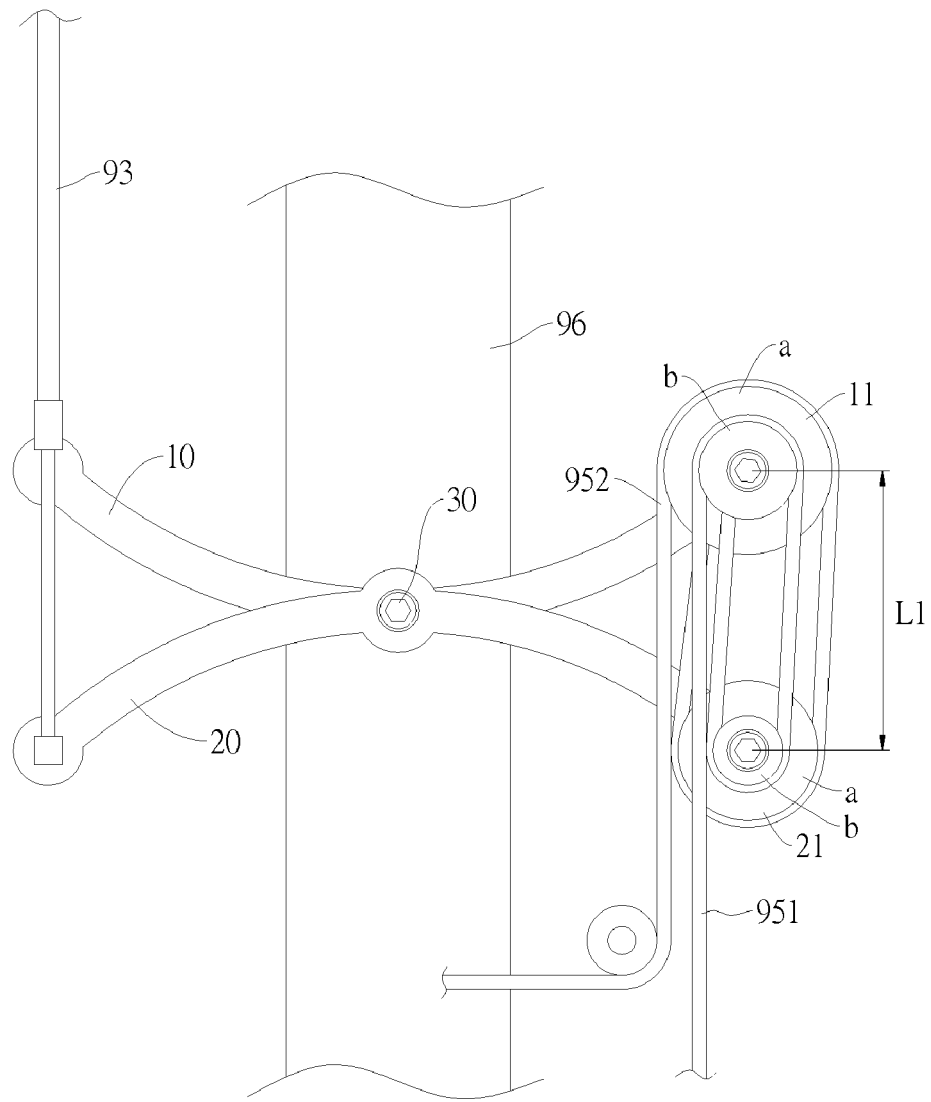
FIG. 4 is a floor plan of the first preferred embodiment of the present invention.
Figure 5:
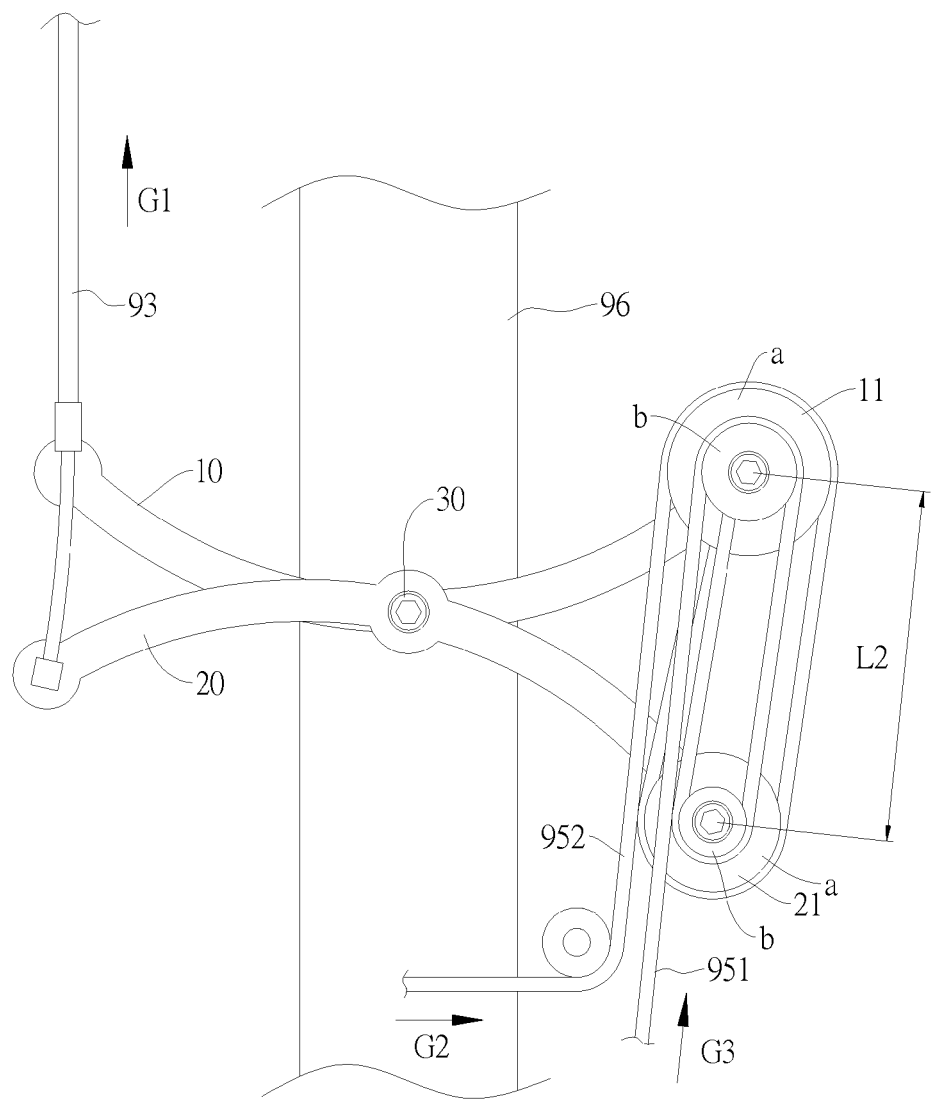
FIG. 5 is a schematic view showing an operating status of the preferred embodiment of the present invention.

According to the operating status respectively illustrated in FIGS. 4 and 5, a distance between centers of both rollers 11, 21 is designated as L1 when the brake cable 93 connected to the brake lever is not yet pulled as illustrated in FIG. 4; when the brake cable 93 is pulled in a direction marked by an arrow G1 in FIG. 5, a braking force is created to move the primary mechanism comprised of both arc levers 10, 20. The primary mechanism transfers the braking force to the secondary power transmission mechanism, and the distance between both centers of rollers 11, 21 disposed on the opposite side of both arc levers 10, 20 relatively increase to that as designated by L2. Meanwhile, both of the lead cable 952 of the rear brake held by both larger wheels a of two rollers 11, 21 and the lead cable 951 of the front brake held by both smaller wheels b of two rollers 11, 21 create a pull force (as designated by arrows G2 and G3) for the secondary power transmission mechanism to respectively transfer the braking force to the front and the rear brakes; and the rear wheel brake 942 will first brake the rear wheel before the front wheel brake 941 applying a brake on the front wheel.

Figure 6:
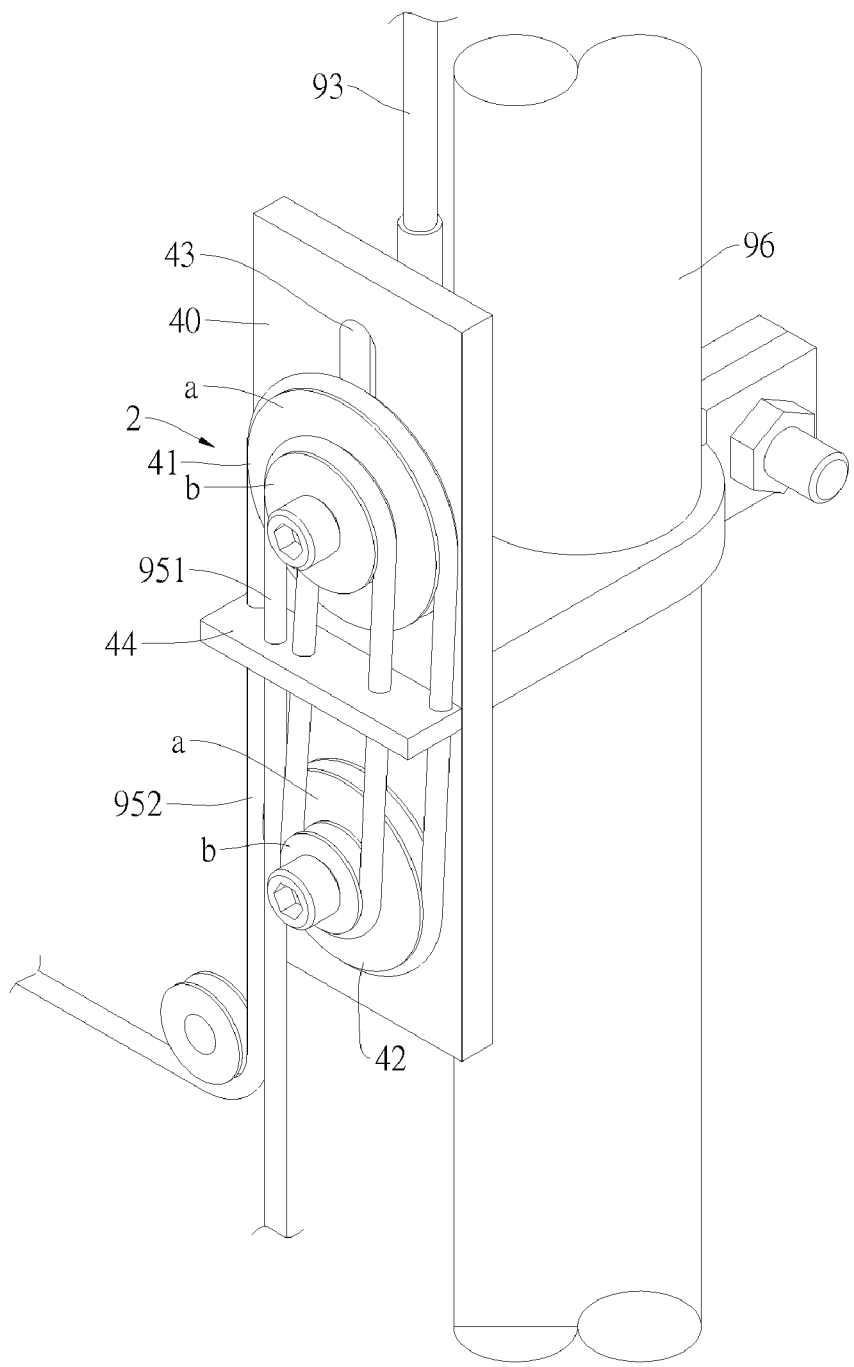
FIG. 6 is a perspective view showing a second preferred embodiment of the present invention.
Figure 7:
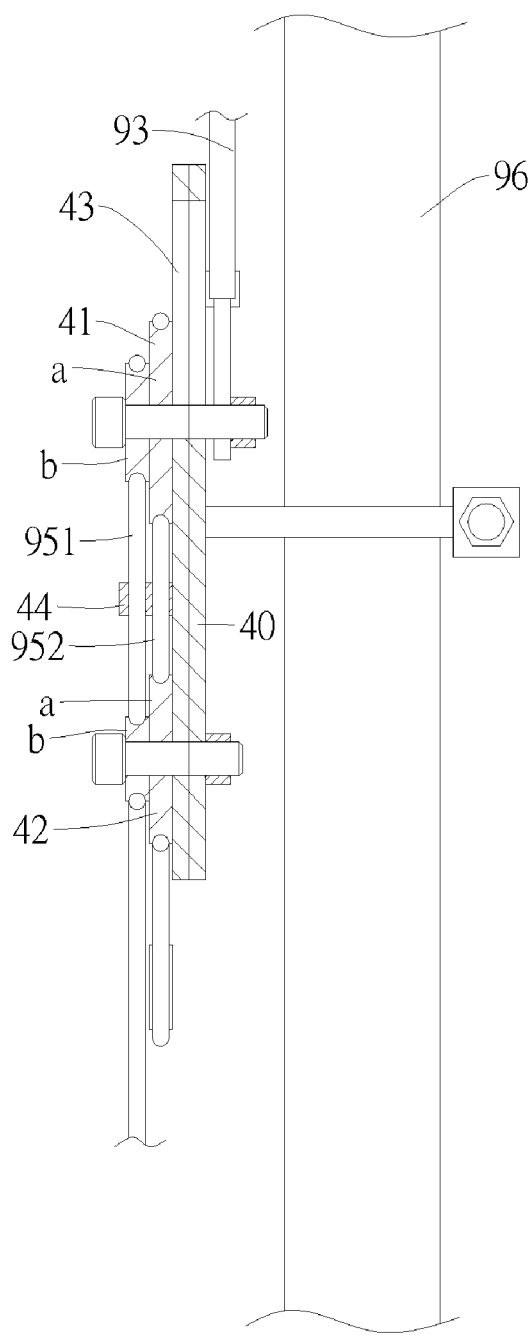
FIG. 7 is a sectional view of the second preferred embodiment of the present invention.

In another preferred embodiment of the present invention as illustrated in FIGS. 6 and 7, a safety braking system 2 is disposed with a holding base 40 fixed to the head tube 96; an upper roller 41 and a lower roller 42 are provided on the holding base 40; the lower roller 42 may be provided as a stationary roller or a roller permitted to move downwardly; the upper roller 41 against the lower roller 42 displaces along a channel disposed on the holding base; and the brake cable 93 of the brake lever is directly connected to the upper roller 42. When the brake lever is applied, the brake cable 93 pulls the upper roller 42 to move upwardly. Each of both the upper and the lower rollers 41, 42 includes a larger wheel a and a smaller wheel b each having a groove along its edge; both larger wheels a hold a lead cable 952 of the rear brake and both smaller wheels b hold a lead cable 951 of the front brake; and both lead cables 951, 952 pass through a lead cable holding frame 44.

Figure 8:
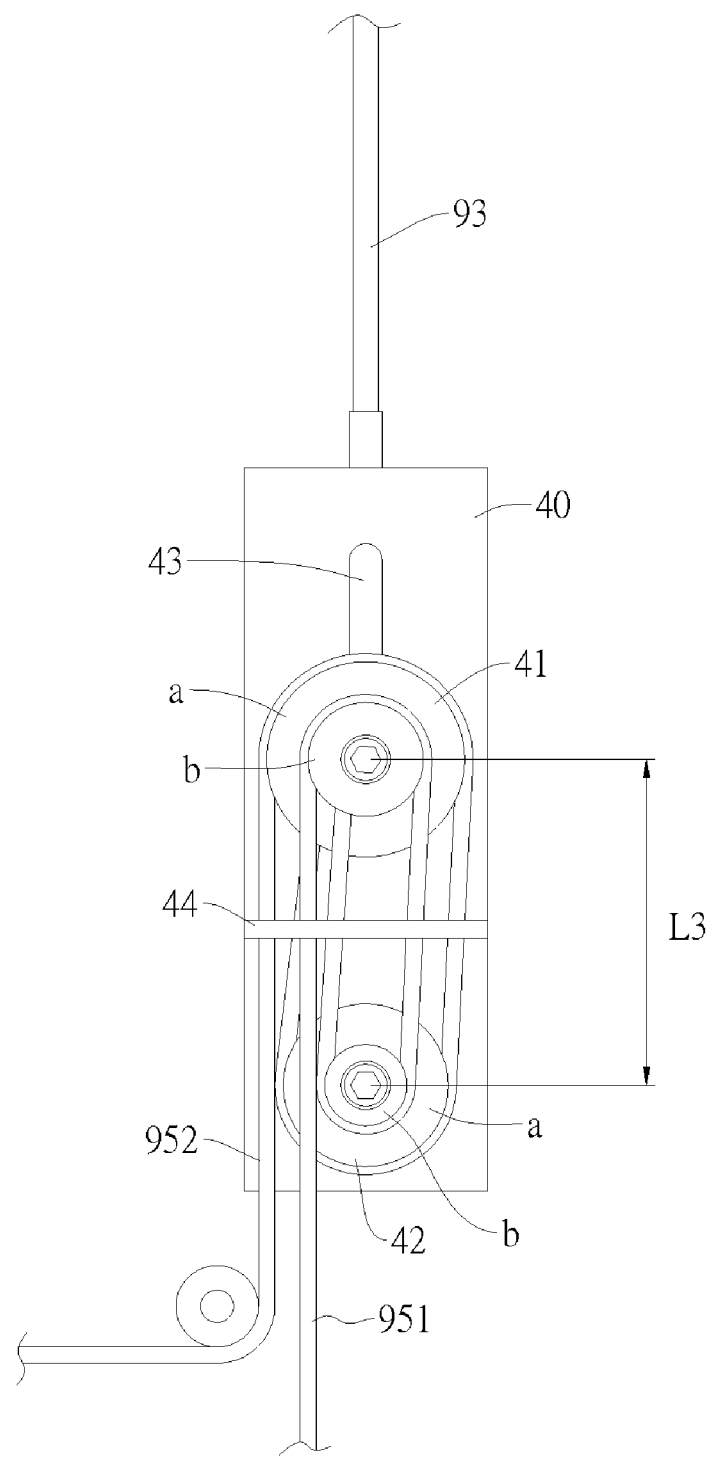
FIG. 8 is a floor plan of the second preferred embodiment of the present invention.
Figure 9:
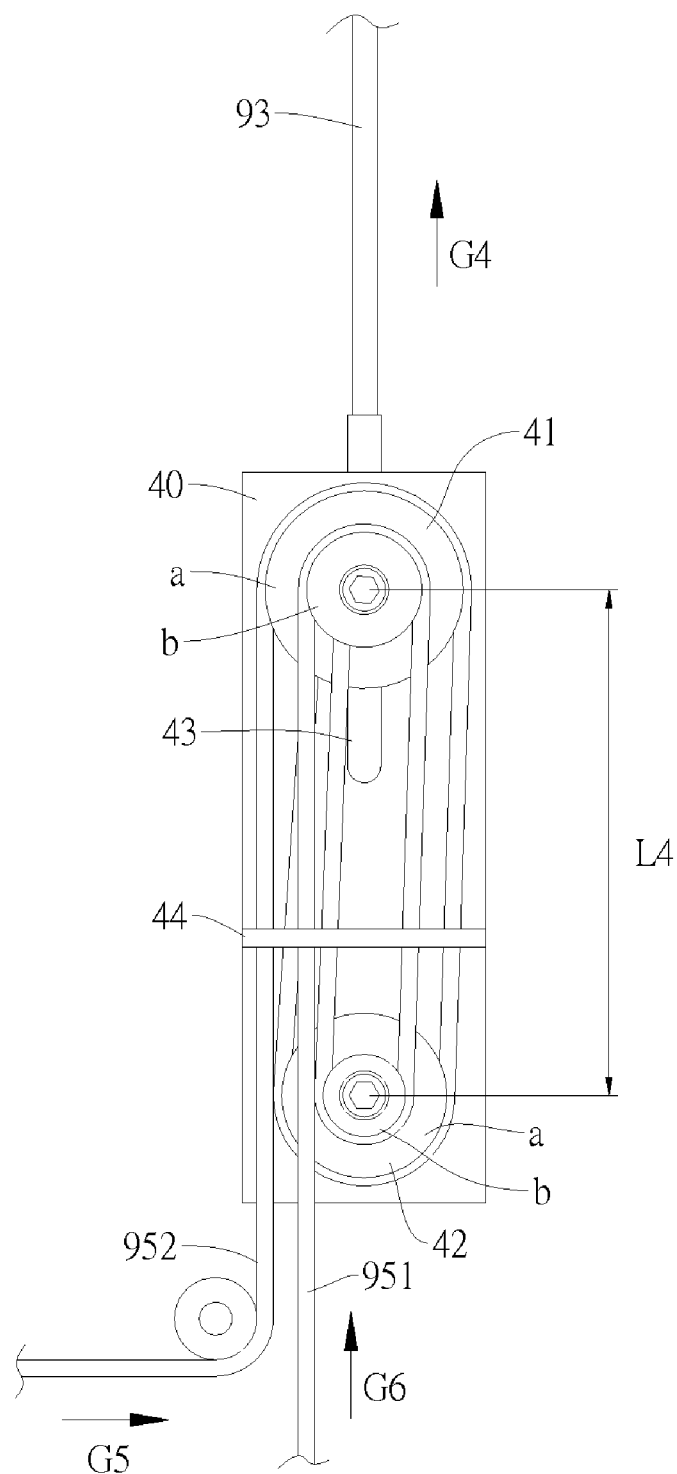
FIG. 9 is a schematic view showing an operating status of the second preferred embodiment of the present invention.

According to an operating status respectively illustrated in FIGS. 8 and 9, a relative distance between both centers of the upper and the lower rollers 41, 42 is designated as L3 as illustrated in FIG. 8 when a brake cable 93 connected to a brake lever is not yet pulled. When the brake cable 93 is pulled in a direction marked by an arrow G4 as illustrated in FIG. 9, a braking force is created, the upper roller 41 moves upward for the relative distance between both centers of the upper and the lower rollers 41, 42 is increased up to L4; and the braking force is transferred to both lead cables 951, 952 respectively of the front and the rear brakes. Meanwhile, both of the lead cable 952 of the rear brake held by both larger wheels a of two rollers 11, 21 and the lead cable 951 of the front brake held by both smaller wheels b of two rollers 11, 21 create a pull force (as designated by arrows G5 and G6) and the rear wheel brake 942 will first brake the rear wheel before the front wheel brake 941 applying a brake on the front wheel.

Figure 10:
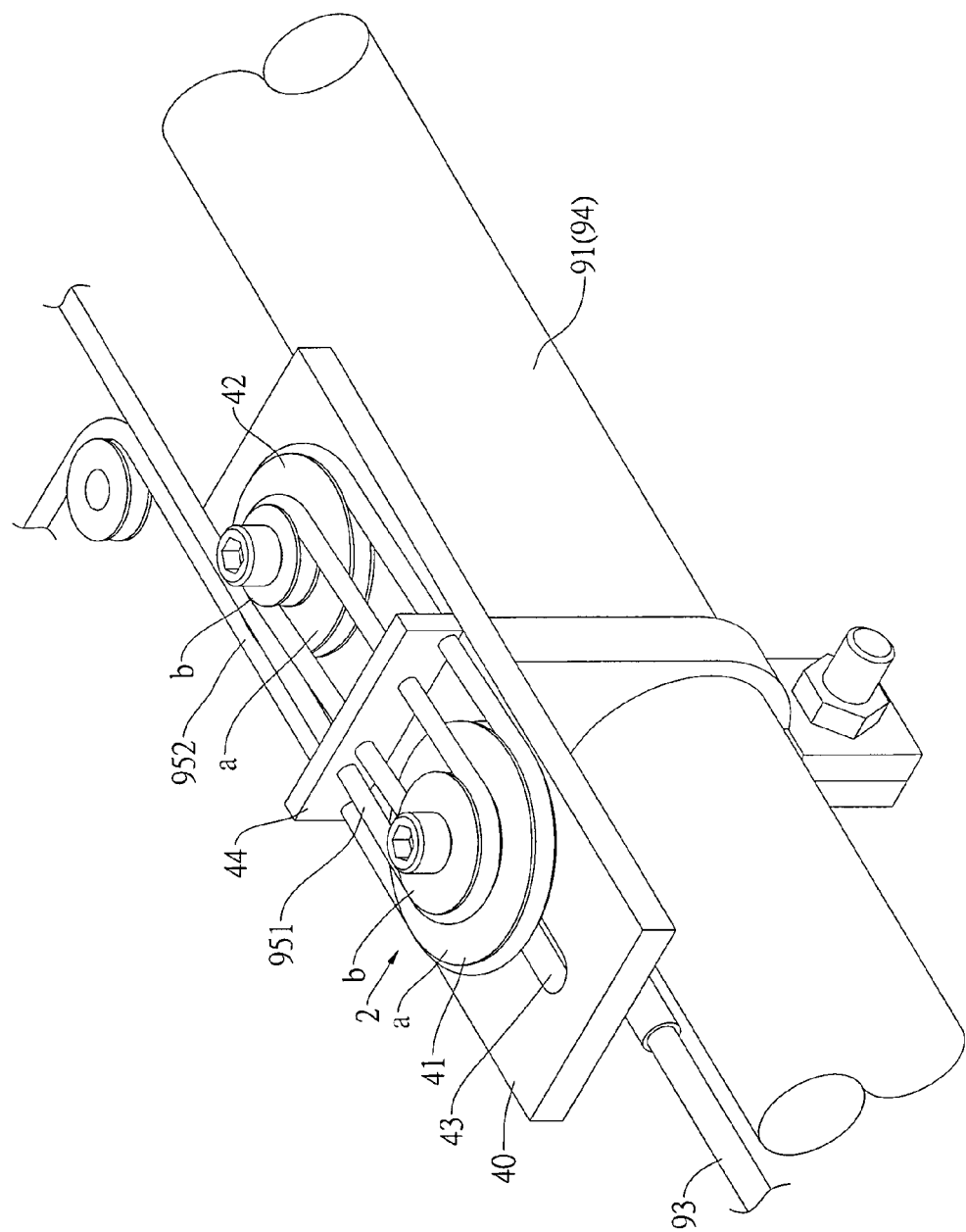
FIG. 10 is a schematic view showing that the second preferred embodiment of the present invention is laterally mounted.

Alternatively, the safety braking system 2 of the present invention is mounted to at where appropriately between the right and the left handlebars 91 or the stem 94 connecting both handlebars and the head tube; and the safety braking system 2 may be mounted horizontally as illustrated in FIG. 10 or vertically as illustrated in FIG. 6.

The brake cable of the brake lever may be connected to a rack, i.e., the primary mechanism; and a gear set connected to both rollers bits the rack. Each roller includes a larger wheel and a smaller wheel with each having a groove along its edge, and a distance between both centers of two rollers relatively increases when the brake cable pulls both rollers on the rack, a variable summary design of the present invention protected by a patent.

Figure 11:
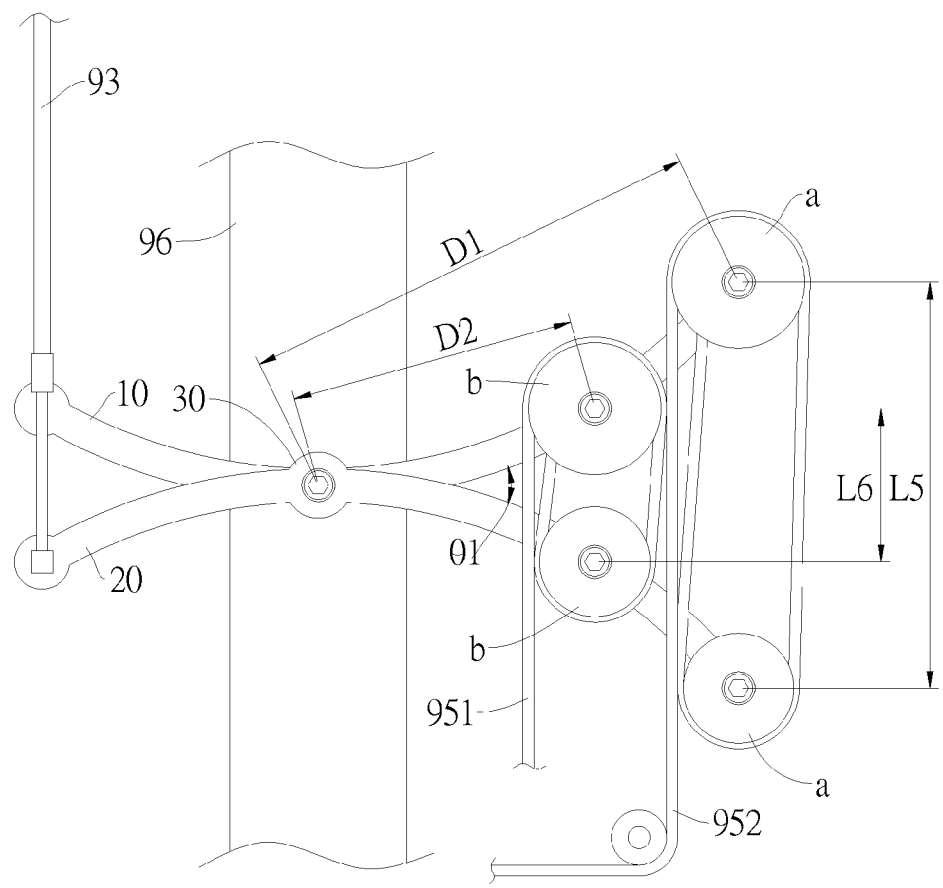
FIG. 11 is a perspective view showing a perspective view of a third preferred embodiment of the present invention.
Figure 12:
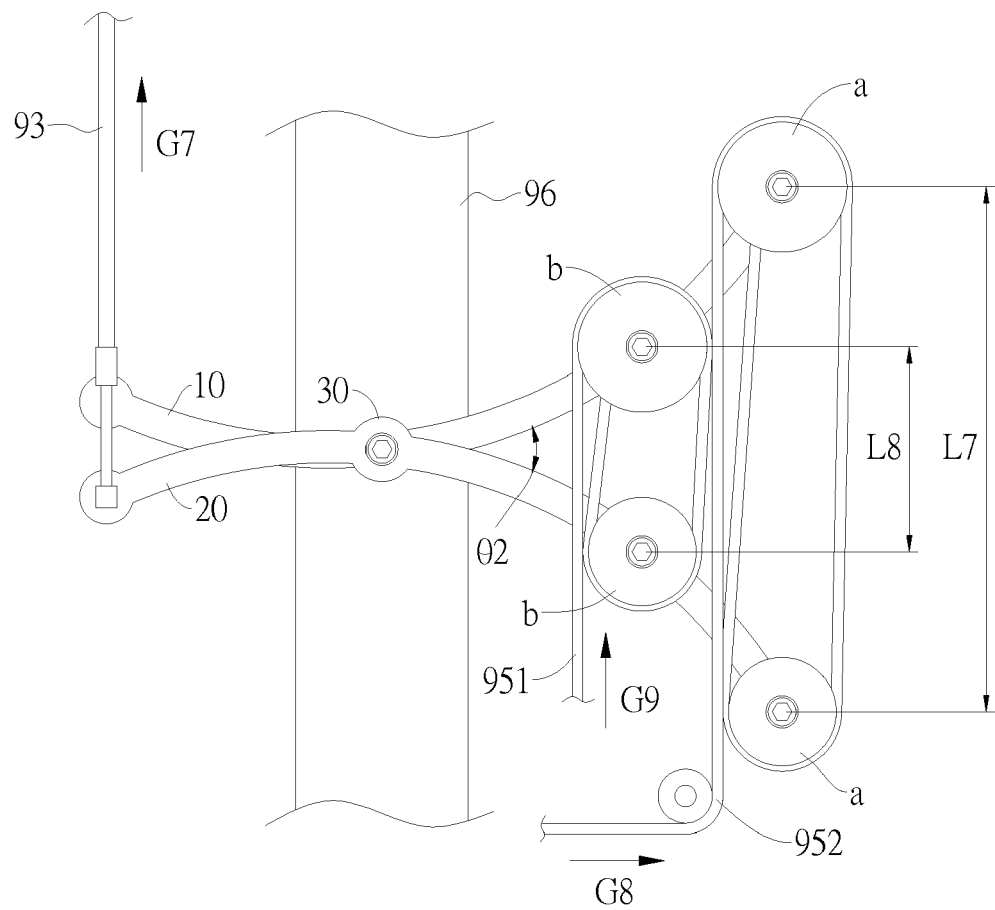
FIG. 12 is a schematic view showing the third preferred embodiment of the present invention.

According to another preferred embodiment yet of the present invention as illustrated in FIGS. 11, 12. The safety braking system 2 mounted to the head tube 96 has two arc levers 10, 20 pivoted to each other at a pivoting point 30. One side of both arc levers 10, 20 is connected to a brake cable 93 of the brake lever to form a primary mechanism; on the opposite side of the pivoting point 30 are respectively provided with two rollers a, b, with each having a groove along its edge, to form a secondary power transmission mechanism. Both wheels a hold a lead cable 952 of the rear wheel brake and another two wheels b hold a lead cable 951 of the front wheel brake. As illustrated, when the brake cable 93 connected to the brake lever is not pulled, a distance between both centers of two wheels a is designated as L5 and a distance between both centers of two wheels b, L6. When the brake lever is applied by a rider to pull the brake cable 93 in a direction marked G7 as illustrated in FIG. 12, a braking force is generated for the primary mechanism comprised of both arc levers to move for transferring the braking force to the secondary power transmission mechanism and both distances L5, L6 on the opposite side of both arc levers increase up to that respectively designated as L7 and L8. Meanwhile, both of the lead cable 952 of the rear brake held by both wheels a and the lead cable 951 of the front brake held by both wheels b create a pull force (as designated by arrows G8 and G9) for the secondary power transmission mechanism to respectively transfer the braking force to the front and the rear brakes; and the rear wheel brake 942 will first brake the rear wheel before the front wheel brake 941 applying a brake on the front wheel. In the preferred embodiment, a distance D1 between an axes of the wheel a and the pivoting point 30 is greater than D2, a distance between an axis of the wheel b and the pivoting point. According to the law of tangent of trigonometric function:

$$2D_1 \times \text{SIN}\frac{\theta_1}{2} = L5 \quad 2D_2 \times \text{SIN}\frac{\theta_1}{2} = L6$$

Therefore, when $\theta_1$ is enlarged to $\theta_2$, both distances L7, L8 between wheels a and wheels b are respectively:

$$2D_1 \times \text{SIN}\frac{\theta_2}{2} = L7 \quad 2D_2 \times \text{SIN}\frac{\theta_2}{2} = L8$$

The distance increased thus is:

$$L7 - L5 = 2D_1 \times \left(\text{SIN}\frac{\theta_2}{2} - \text{SIN}\frac{\theta_1}{2}\right)$$

$$L8 - L6 = 2D_2 \times \left(\text{SIN}\frac{\theta_2}{2} - \text{SIN}\frac{\theta_1}{2}\right)$$

Accordingly, when D1 is greater than D2, the distance increased between two wheels a is greater than that between two wheels b. That is, amount of change in the length of the lead cable 952 is greater than that of the lead cable 951, so that when both brake levers are pulled at the same time, the rear wheel brake operates first to brake.

Figure 13:
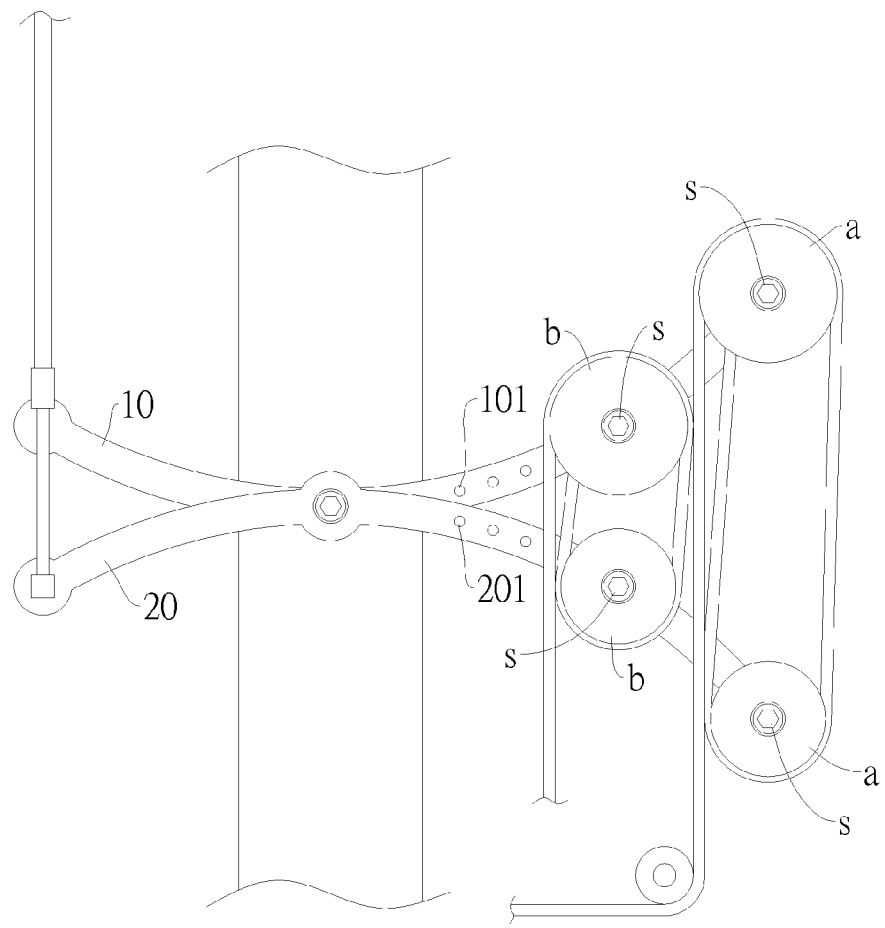
FIG. 13 is a schematic view showing a locating mechanism in the present invention.
Figure 14:
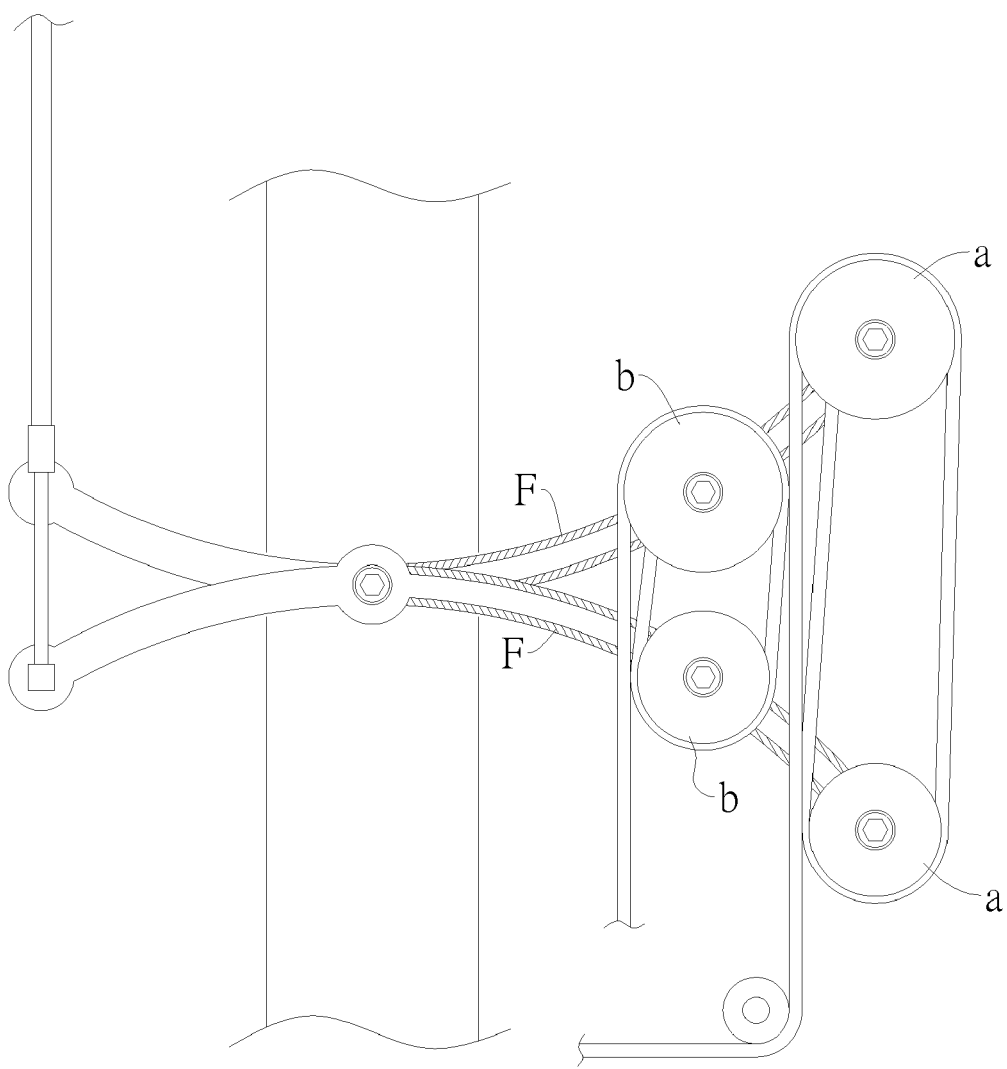
FIG. 14 is a schematic view showing another locating mechanism in the present invention.
Figure 15:
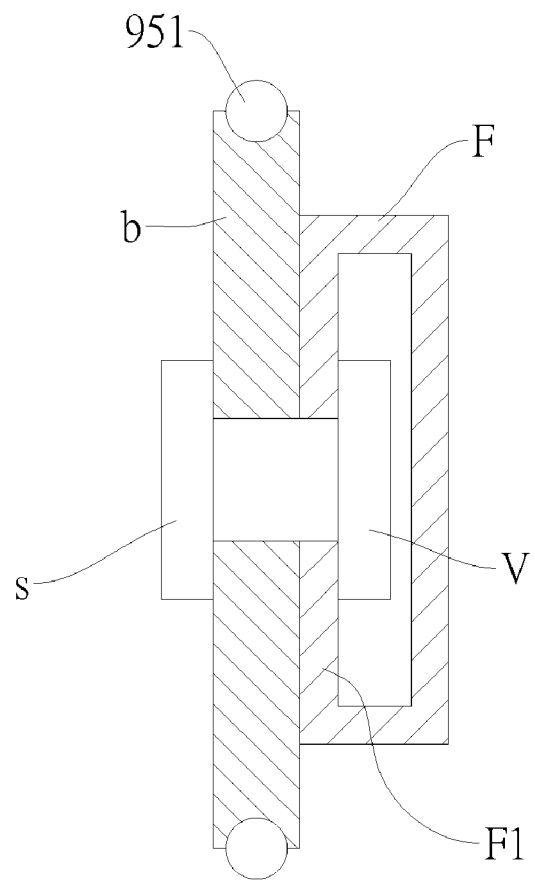
FIG. 15 is a sectional view of the locating mechanism taken from FIG. 14.

Referring to FIGS. 13 and 14, a locating mechanism is disposed to both arc levers 10, 20 to allow both wheels a, b to adjust their positions on the arc levers as desired. As illustrated in FIG. 13, multiple holes 101, 201 are provided on both arc levers 10, 20; and a locking member S penetrates through selected holes 101, 102 on both arc levers 10, 20 and those wheels each having a groove along its edge to secure both arc levers 10, 20 to those wheels. The locking member S may be related to a screw or a fast connector. Alternatively as illustrated in FIGS. 14 and 15, a chute F and a slide V combined with and placed in the chute F are disposed on each of both arc levers. When a locking member S is released, the wheel slides in the chute F to reach a preset location, and the locking member S pulls closer the slide V to compress with those wheels on a wind F1 of the chute F so to locate the arc levers to those wheels. The locking member S may be related to a screw or a fast connector. With the locating mechanism, the rider may adjust the position of each wheel having a groove along its edge according to his/her particular riding behavior to achieve the optimal braking effects.

Figure 16:
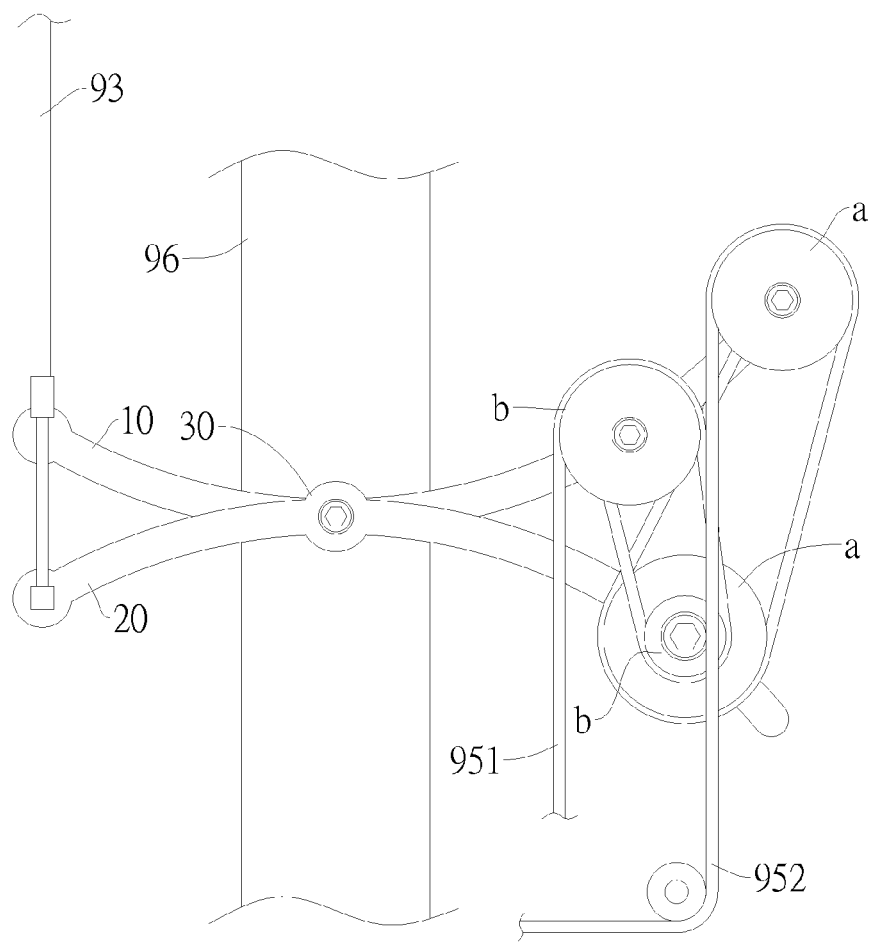
FIG. 16 is a front view showing another preferred embodiment yet of the present invention.
Figure 17:
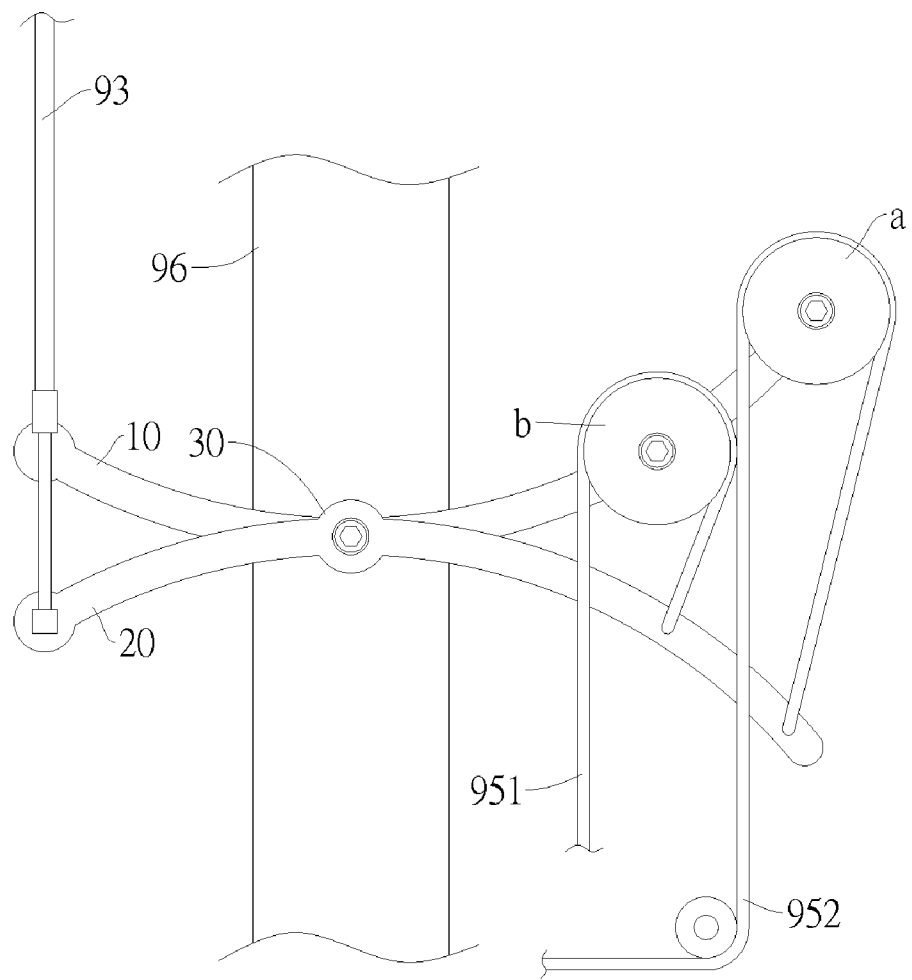
FIG. 17 is a front view showing another preferred embodiment yet of the present invention.

Now referring to FIG. 16, one wheel a and one wheel b on one arc lever are locked at a same point (concentrically) to achieve purpose of having the amount of change of the lead cable 952 become greater than that of the lead cable 951 thus to allow the rear wheel brake connected to the lead cable 952 to act first. Furthermore, as illustrated in FIG. 17, both ends respectively of the lead cable 951 and the lead cable 952 are directly fixed to the arc lever 20 to achieve the same purpose. The preferred embodiment illustrated in FIGS. 16 and 17 may be provided with the same locating mechanism as that mounted to the preferred embodiment illustrated in FIGS. 13, 14, and 15 to achieve the purpose of adjusting the position of each wheel having a groove along its edge on the arc levers.

The safety braking system 2 of the present invention may be mounted to where appropriately between both handlebars 91, on the stem 94 that connects both handlebars 91 and the head tube vertically or horizontally.

It is to be noted that the preferred embodiments disclosed in the specification and the accompanying drawings are not limiting the present invention; and that any construction, installation, or characteristics that is same or similar to that of the present invention should fall within the scope of the purposes and claims of the present invention.

I claim:

1. A safety braking system mounted to a two-wheel vehicle having a right brake lever and a left brake lever, the safety braking system comprising:

at least two arc levers being pivoted to each other about a pivoting point, wherein a side of the arc levers is connected to brake cables from the left and right brake levers, and an opposing side of the arc levers is disposed with a plurality of wheels;

wherein at least two of the wheels that are farther from the pivoting point hold a lead cable from a rear wheel brake of the vehicle; and wherein at least two of the wheels that are closer to the pivoting point hold a lead cable from a front wheel brake of the vehicle.

* * * * *